US008683453B2

(12) United States Patent
Patel et al.

(10) Patent No.: US 8,683,453 B2
(45) Date of Patent: Mar. 25, 2014

(54) SYSTEM FOR OVERRIDING INTERPRETED BYTE-CODE WITH NATIVE CODE

(75) Inventors: Mark A. Patel, Highland Park, IL (US); Steve R. Bunch, Harvard, IL (US); Raymond B. Essick, Glen Ellyn, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1840 days.

(21) Appl. No.: 11/565,099

(22) Filed: Nov. 30, 2006

(65) Prior Publication Data

US 2008/0134154 A1   Jun. 5, 2008

(51) Int. Cl.
*G06F 9/45* (2006.01)

(52) U.S. Cl.
USPC ......................................... 717/139

(58) Field of Classification Search
USPC ......................................... 717/139
See application file for complete search history.

(56) References Cited

U.S. PATENT DOCUMENTS

| 6,067,577 | A | 5/2000 | Beard | |
|---|---|---|---|---|
| 6,295,638 | B1 | 9/2001 | Brown et al. | |
| 6,834,391 | B2 | 12/2004 | Czajkowski et al. | |
| 6,907,519 | B2 * | 6/2005 | Desoli | 712/227 |
| 6,948,164 | B2 * | 9/2005 | Tinker | 717/168 |
| 7,124,407 | B1 * | 10/2006 | Wallman | 717/154 |
| 7,210,140 | B2 * | 4/2007 | Lindwer et al. | 717/158 |
| 7,624,373 | B2 * | 11/2009 | Pandit et al. | 717/115 |
| 7,797,579 | B2 * | 9/2010 | Dickerson et al. | 714/35 |
| 7,886,294 | B2 * | 2/2011 | Dostert et al. | 718/1 |
| 8,015,557 | B2 * | 9/2011 | Chen et al. | 717/162 |
| 2002/0108103 | A1 * | 8/2002 | Nevill | 717/139 |
| 2003/0033588 | A1 * | 2/2003 | Alexander | 717/107 |
| 2004/0243989 | A1 * | 12/2004 | Owens et al. | 717/151 |
| 2006/0107257 | A1 * | 5/2006 | Ellison | 717/148 |
| 2006/0168567 | A1 | 7/2006 | Kressin et al. | |
| 2006/0190934 | A1 * | 8/2006 | Kielstra et al. | 717/148 |

OTHER PUBLICATIONS

Paleczny M et al, "The Java Hotspot TM Server Compiler", Java Virtual Machine Research and Technology Symposium, Apr. 23, 2001, pp. 1-13, Monterey, CA., US.
Paragon Pinnacles: "Covert Java: Techniques for Decompiling, Patching, and Reverse Engineering" Article 13288, vol. 76, Issue 4, Jun. 21, 2004, 2 pages.
"Universal Binary Programming Guidelines, Second Edition" Apple Computer, Inc., Feb. 7, 2006, 92 pages.
Myers and Bazinet, "Intercepting Arbitrary Functions on Windows, UNIX, and Macintosh OS X Platforms" University of Maryland, CS-TR-4585, UMIACS-TR-2004-28; 2004 9 pages.

* cited by examiner

*Primary Examiner* — John Chavis

(57) ABSTRACT

In a method of executing a program on an interpreted byte-code language, a plurality of interpreted bytecode modules (each having an associated name) is loaded. A pointer is directed from each method entry to a different interpreted bytecode module. A native code module library is loaded and includes a native code module (also having an associated name) that implements a function corresponding to an interpreted bytecode module. When the name of an interpreted bytecode module corresponds to the name of a native code module, the pointer directed to the interpreted bytecode module is redirected to the corresponding native code module. Each interpreted bytecode module and native code module pointed to by the each method entry in the method table is executed according to an application-controlled order of execution.

20 Claims, 5 Drawing Sheets

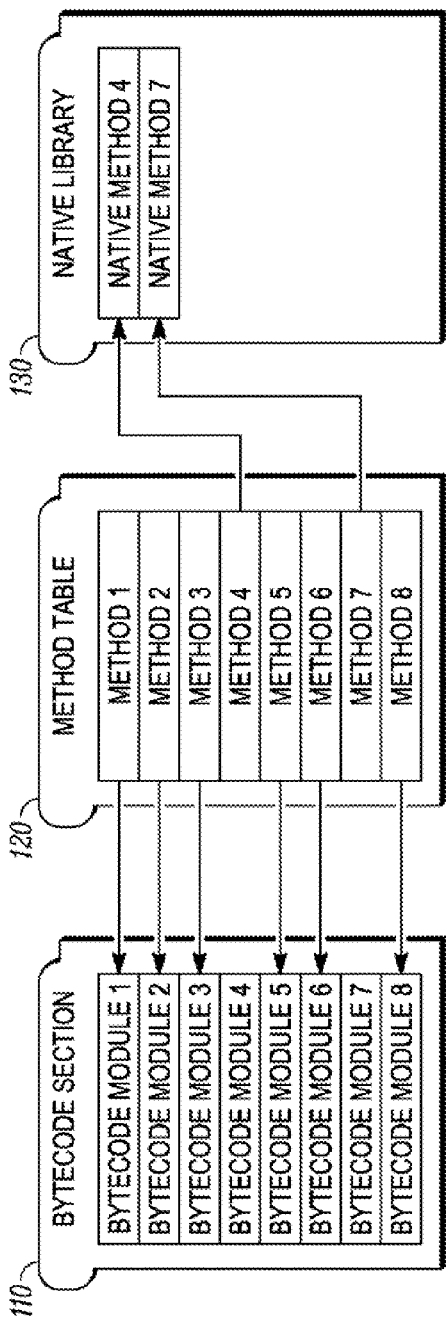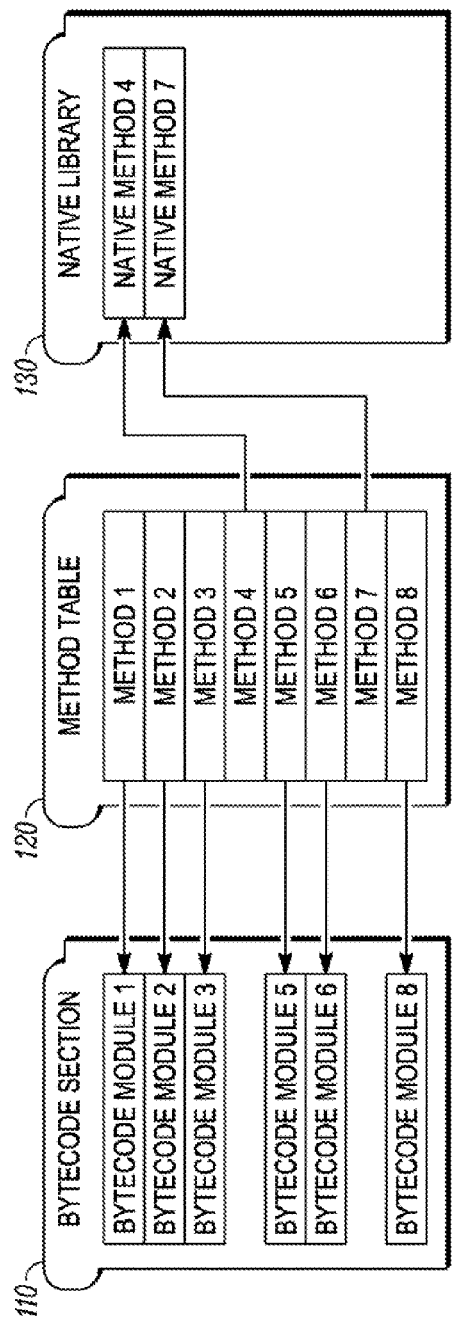

SYSTEM FOR OVERRIDING INTERPRETED BYTE-CODE WITH NATIVE CODE

BACKGROUND OF THE INVENTION

1. Field of the Invention

The present invention relates to computational systems and, more specifically, to a system that runs modules written in an interpreted bytecode language.

2. Background of the Invention

Bytecode is computer object code that is processed by a program, referred to as a virtual machine, rather than directly by the actual processor on which the processed code runs. A virtual machine converts each bytecode instruction into specific machine-dependant instructions that are executable on the processor. Most high level computer languages employ a different compiler for each different type of operating system. Compiling a bytecode program into a virtual machine language allows a developer to compile the bytecode program only once, even though it may be executed on many different types of processors employing different operating systems.

Programming instructions written in a bytecode are designed to be executed by a virtual machine rather than directly by dedicated hardware. The virtual machine acts as an interface layer between the bytecode and the actual processor on which the bytecode is executed. Interpreted bytecode computer languages provide program developers with a platform-independent language. It is the virtual machine that is adapted for execution of specific computer platforms, rather than the bytecode compiler.

Bytecode languages are used by programming language implementations to reduce dependence on specific hardware since the same binary code can be executed across several different platforms. Compared to machine-specific source code, bytecodes tend to be less abstract and more compact. Since a bytecode program is normally executed by parsing the instructions one at a time using an interpreter, bytecode programs tend to be highly portable. While the underlying virtual machine may not be portable between platforms, the bytecode itself remains highly portable.

Frequently, different parts of an interpreted bytecode program are stored in separate files, similar to object modules. Many language implementations execute a program in two phases, first compiling the source code into bytecode, and then passing the bytecode to the virtual machine. Thus, may object modules are often written in a source code that is compiled into a bytecode, which is then interpreted by a virtual machine.

One commonly used bytecode language is Java™, which uses a bytecode interpreter to translate the bytecode to machine code before execution. Java is an object-oriented programming language with a built-in application programming interface (API) that can handle graphics and user interfaces and that can be used to create applications. Since there is an extensive set of available Java™ API's, Java™ is used extensively by developers, especially those creating Internet applications.

However, because they are interpreted run time, rather than compiled before run time, bytecode implementations often do not execute the functions of a program in the most efficient manner. Sometimes it is desirable to substitute certain modules in a bytecode program with code written in the native language of a machine. This is especially true for modules that are computationally intensive. Modules written in a native language, on the other hand, can be written in the most efficient manner without having to incur the penalties associated with interpreting the bytecode.

The ability to supplement bytecode applications with native code is desirable for a number of reasons. First, computationally-complex operations can usually be performed faster when implemented in native code instead of bytecode. Second, support for native code permits the reuse of algorithms and applications that have been written in existing compiled language for other platforms.

The Java™ language specification does include the ability to declare a method as being implemented in a native language. Native method support as defined in the Java™ language does not provide a way in which a default Java™ implementation can be provided for a native method. If for some reason the native code cannot be used (e.g. due to incompatible hardware, security permissions, etc.), then the method is entirely unusable and the application will not function. Other bytecode based systems may provide a mechanism for packaging both a bytecode and native version of a given method in a single load and the operating system will use the native version if possible, but can default to the bytecode version if needed. However, such a 'fat binary' approach packages both implementations as part of a single module. In these systems, native implementations cannot be developed, tested and deployed separately.

In the Java™ language specification, a native method modifier is used to indicate that a particular method is implemented natively. The presence of this modifier indicates to the virtual machine (VM) that the method will be linked to appropriate native code instead of a block of bytecode. Until the library is loaded and linking occurs, the method has no code associated with it and cannot be invoked without an error occurring. When the corresponding library is loaded, the VM updates the method table so that the native methods point to their corresponding functions in the native library.

Typical existing systems, as shown in FIG. 1, will load a bytecode library 10 from which it generates a method table 20. The method table includes a plurality of method entries, each of which points to either a bytecode module or to a native method module. At execution, the virtual machine will execute the modules pointed by the method table as requested by the application. If a native method is pointed to by the method table 20 (as is the case with native methods 4 and 7, in the case shown), the method entries will point to code modules that have been previously loaded on the system. If one of the native method modules is unavailable or is not functioning properly, then the system will enter an error condition, as there is not a bytecode module to replace it.

Therefore, there is a need for a system that allows an interpreted bytecode module to be replaced with a native method module, while preserving the interpreted bytecode module.

SUMMARY OF THE INVENTION

The disadvantages of the prior art are overcome by the present invention which, in one aspect, is a method of executing a program on an interpreted bytecode language virtual machine that is operable on a digital computer that stores a method table that includes a plurality of method entries. A plurality of interpreted bytecode modules is loaded. Each interpreted bytecode module is written in the interpreted bytecode and has a name associated therewith. A pointer is directed from each method entry in the method table to a different interpreted bytecode module of the plurality of interpreted bytecode modules so that each method entry points to a corresponding interpreted bytecode module. A first native code module library is loaded. The first native code module library includes at least one first native code module that implements a function corresponding to a selected interpreted bytecode module of the plurality of interpreted bytecode modules. The first native code module also has a name associated therewith that corresponds to the selected interpreted bytecode module. When the name of an interpreted bytecode module corresponds to the name of a native code module, the pointer from the method entry corresponding to the interpreted bytecode module is redirected so that the pointer points to the native code module corresponding to the interpreted bytecode module. Each interpreted bytecode module and native code module pointed to by the each method entry in the method table is executed according to an application-controlled order of execution.

In another aspect, the invention is a method of executing interpreted bytecode that operable on a digital computer that stores a method table that includes a plurality of method entries, each method entry corresponding to a predetermined code module. The method determines whether each method entry corresponds to an interpreted bytecode module or a native language module. If a method entry corresponds to a native language module, the native language module is executed. Otherwise, the interpreted bytecode module is executed.

In yet another aspect, the invention is a system for executing interpreted bytecode, that includes a computer-readable memory and a processor. The computer-readable memory stores a plurality of interpreted bytecode modules, a method table and a native code module library. The method table includes a plurality of method entries. Each method entry points to a selected one of either an interpreted bytecode module stored in the plurality of interpreted bytecode modules or to a native code module in the native code module library. The processor is configured to execute each interpreted bytecode module and native code module pointed to by the plurality of method entries in the method table as requested by an application.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 2A-2C are a series of schematic diagrams of a system that loads a native library.

DETAILED DESCRIPTION OF THE INVENTION

Figure 1:
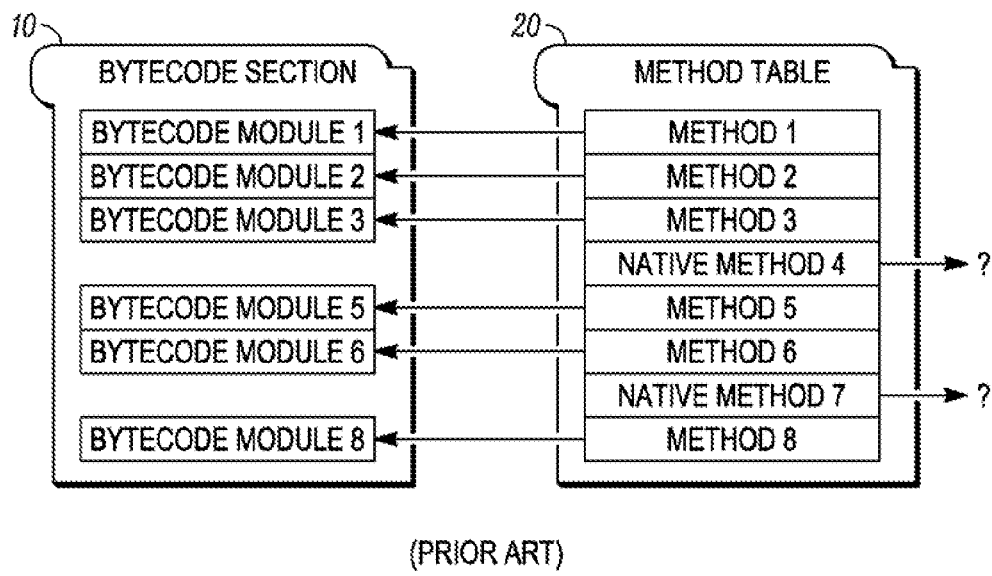
FIG. 1 is a schematic diagram of an existing system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

One embodiment is a system that controls behavior by overriding specific methods in existing software with new versions that offer different behaviors. A base implementation of the software provides a set of default behaviors via a plurality of methods. One or more "overlays" can be used to update a bytecode library at runtime as needed. Each overlay contains replacement implementations of one or more of the methods.

As shown in FIG. 2, one embodiment employs a technique that may be referred to as "native method patching" of bytecode. Instead of relying on explicit native method declarations within the class file, the native method patching technique utilizes the native library to control which methods are natively implemented and the bytecode module itself contains no information suggesting the use of native code. That information is provided exclusively by the presence of a suitable function in the corresponding native library.

Figure 2A:
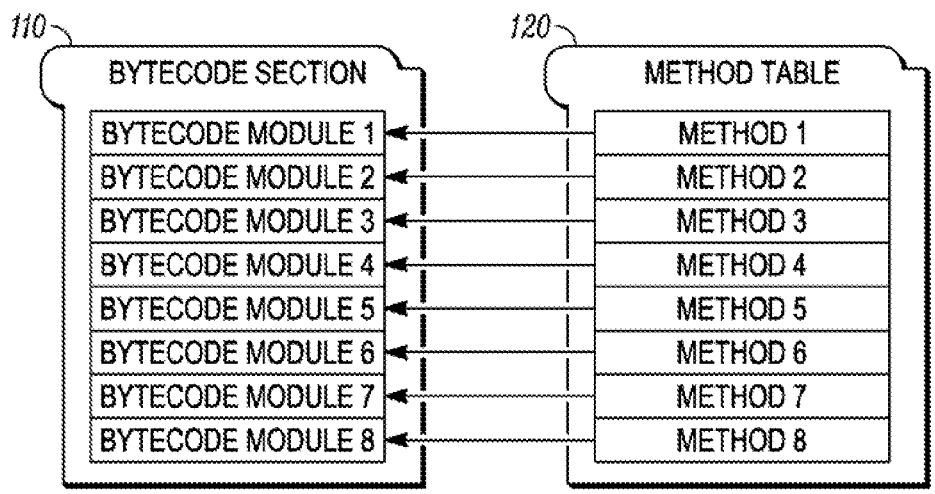

As shown in FIG. 2A, upon loading of a bytecode section 110, all of the methods in the method table 120 have a corresponding code block providing a pure bytecode implementation. When the native library is then loaded, the virtual machine (VM) compares the class's methods with the functions provided by the native library. As shown in FIG. 2B, using a standardized naming convention, the native function names can be mapped to specific methods in the bytecode language class. If a suitable match is found, the VM can then update the class's method table 120 by substituting the existing bytecode implementation with a pointer to the native function.

Optionally, as shown in FIG. 2C the original bytecode implementation may also be discarded to save memory. Thus, a bytecode method is never explicitly declared as being native, but it can be replaced by native code if the VM loads suitable native code that implements it. The linkage between a bytecode module and native code is established after class loading is completed, and therefore after both off-line and runtime verification steps are unaware that native code will be used to implement methods in a class.

Whenever an application attempts to use a native code library, the operation might fail for a variety of reasons including: (1) The application lacks security permissions to use native code; (2) The library is incompatible with the device's processor or operating system; or (3) The library has unsatisfied dependencies caused by the absence or incompatibility of other native code. With a conventional native method declaration, any failure to load the native code will cause an error to occur when the method is invoked. While it is possible to catch such errors and invoke alternative code, this technique must be applied explicitly by the developer on each method call.

With native method patching, a method's bytecode block will continue to function normally until it is replaced by a valid piece of native code. Thus, if native code is unavailable for any reason, the default bytecode implementation of the method remains as a back-up without requiring special steps from the developer. This ability to provide multiple versions of the same code allows an application to run on multiple devices without the need for separate releases to be distributed.

If application size is more important than portability, the developer may chose to implement bytecode methods with simple stubs that do not implement functionality and must be patched with native code. In such cases the overhead of providing multiple implementations is almost eliminated, but with the caveat that the application may be inoperable if the native library fails to load.

The native method patching technique also offers the developer greater flexibility when deciding which parts of an application should be implemented with native code. With traditional native methods, the developer is forced to select the methods that require native implementation explicitly and any changes to that set require modifications to the bytecode class file. However, the native method patching technique allows the set of native methods to be controlled arbitrarily by the contents of the native library, thereby allowing the developer to change the set more easily. In addition, the set of native methods may be varied between devices by changing the contents of the corresponding native libraries, thereby allowing greater reuse of the same bytecode.

Figure 3:
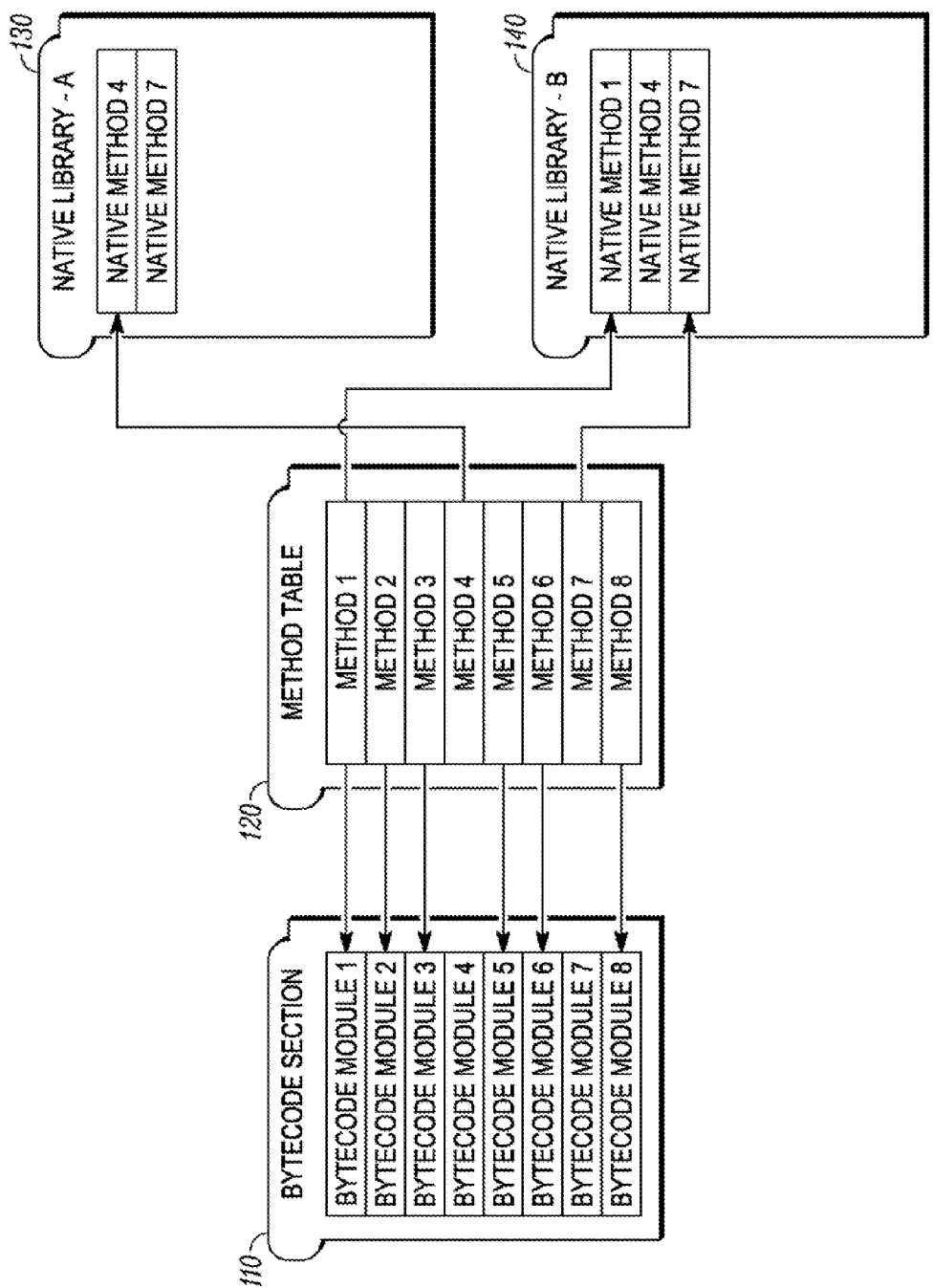
FIG. 3 is a schematic diagram of a system that loads more than one native library.

Furthermore, as shown in FIG. 3, multiple native libraries (e.g., Native Library—A 130 and Native Library—B 140) may be included to provide the user to modify the function of a system using a bytecode language. In one example, the user (or developer) can choose between a first native library 130 and a second native library 140, depending on the functionality desired. In another example, the user can select different modules from both libraries to fine tune the functionality of the system. (In the example shown, the user has elected to use Native Module 4 from Native Library—A 130 and Native Modules 1 and 7 from Native Library—B 140).

Figure 4:
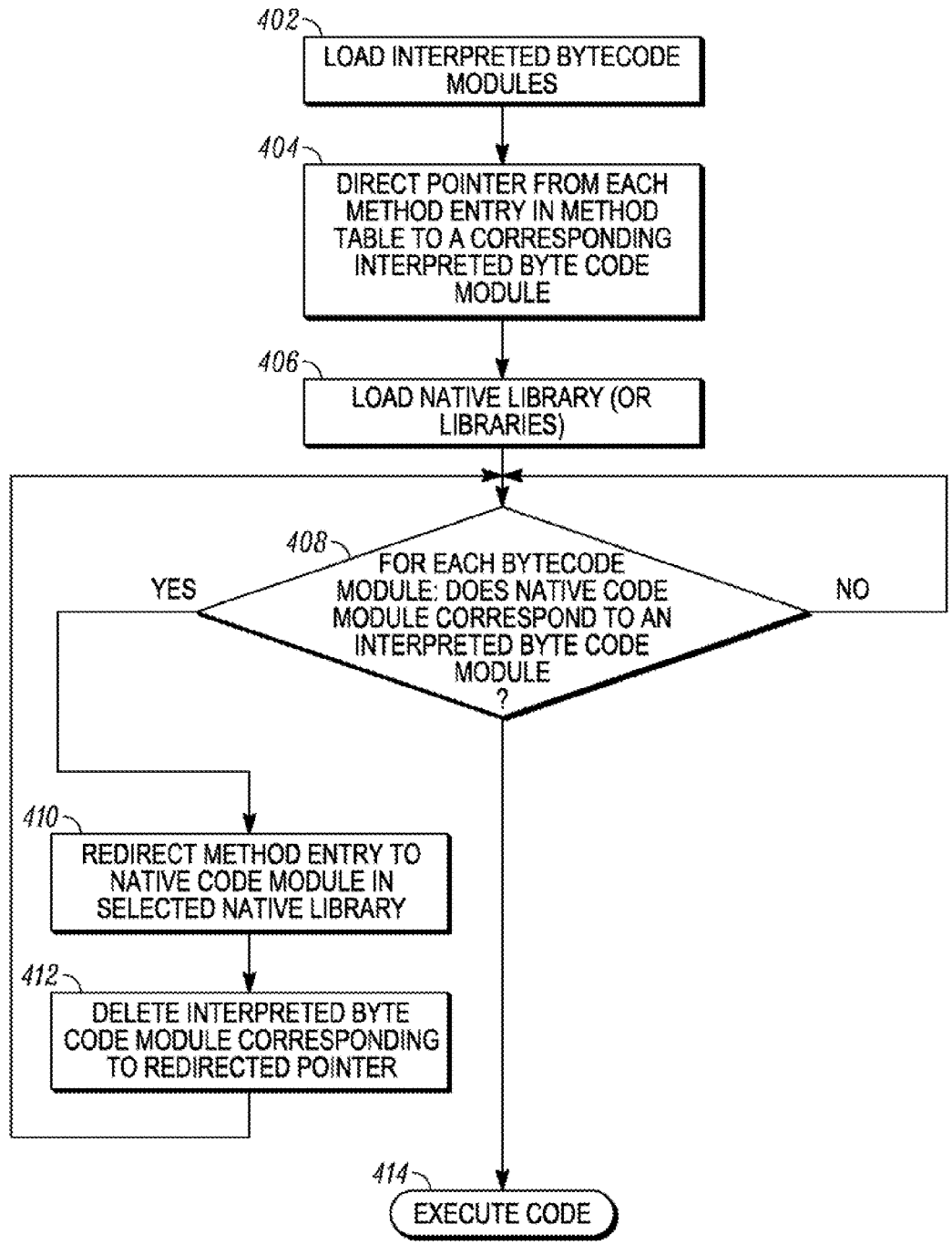
FIG. 4 is a flow chart that demonstrates a method of employing native code libraries with an interpreted bytecode language.

As shown in FIG. 4, in one embodiment, the interpreted bytecode modules are loaded onto the system 402 and a pointer is directed from each method entry in the method table to a different interpreted bytecode module of the plurality of interpreted bytecode modules so that each method entry points to a corresponding interpreted bytecode module 404. The native code module library (or libraries) is loaded 406. For each native code module in the native code library, the system determines 408 if there is a corresponding native code module in the native code library. If so, the pointer to the bytecode module is redirected to the corresponding native code module 410. Optionally, the corresponding interpreted byte code module may be deleted 412 to reduce overhead. The code is then executed 414.

Figure 5A:
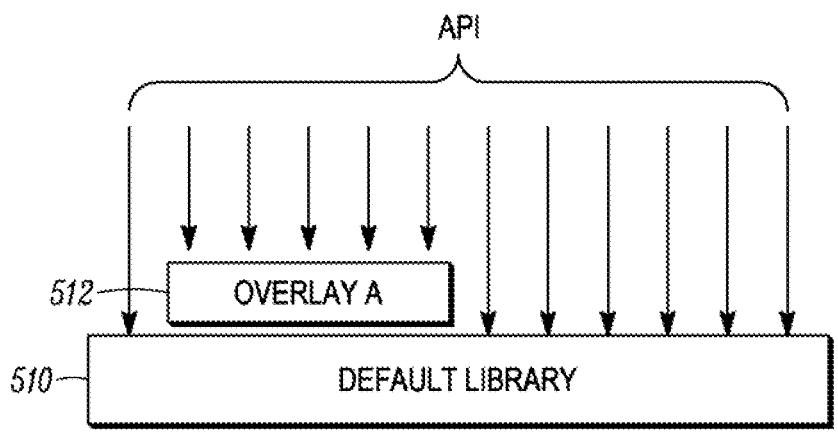
FIGS. 5A-5C are a series of schematic diagrams of a system showing different layers of overlay.
Figure 5B:
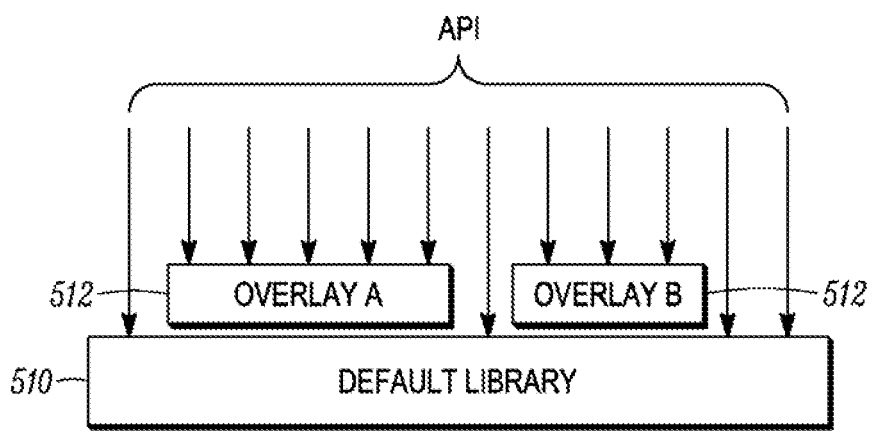
Figure 5C:
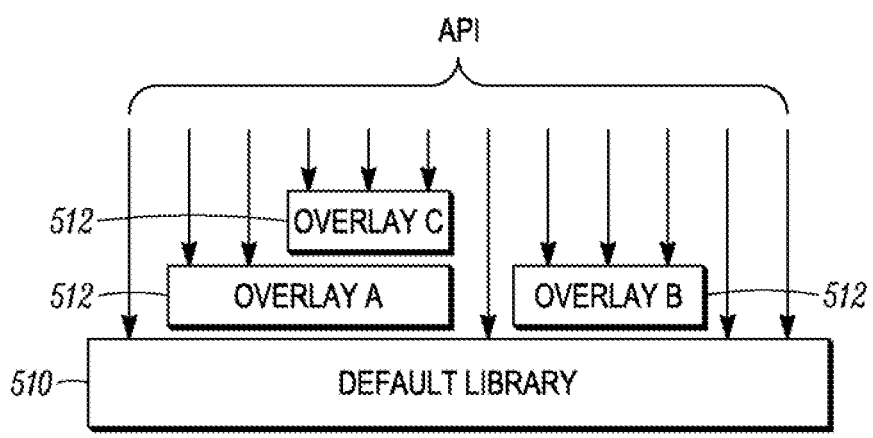

In one embodiment, as shown in FIGS. 5A-5C, the native methods can be thought of as overlays 512 that can operate on top of a default library 510 of bytecode modules. If an overlay 512 is present (indicating a substitute native method), then the API will execute the native methods in the overlay 512. Otherwise, the API will execute the modules in the default library 510. An overlay 512 can update the existing implementation in the default library 510 on a method-by-method basis. As shown in FIGS. 5B and 5C, several overlays 512 can be combined to replace a larger set of behaviors. Overlays 512 can be applied in a specific sequence to control which version of a given method is used. Also, overlays 512 do not have a binary dependency on each other or on the modules in the default library 510.

This system has the advantage of reducing the amount of code that needs to be rebuilt and tested to implement a change or customization, thereby reducing the overall effort and time required. Another advantage is that arbitrary customizations can be made after the product has shipped and changes can be combined arbitrarily. Also, this system has the ability to reduce the code size of the default implementation by deleting unused modules.

The disclosed techniques provide a mechanism by which a regular bytecode method's implementation can be replaced by a native implementation at runtime. By using this approach, a default implementation written in, for example Java™, is always available to run on any device, so portability is preserved. However, the default implementation can be overridden with native code when available.

In one experimental embodiment, a reference implementation was developed using the Java™ CLDC 1.1 Reference Implementation (RI). The Linux™ version of the RI was used in this instance, but the general approach could be easily applied to other operating systems that provide APIs for dynamic library loading.

Since System.loadLibrary is not available in CLDC, an alternative API was needed for loading native code. In addition, the process of patching method tables would be quite slow if methods for all of the loaded classes had to be compared against the contents of the native library, plus there would be additional complexity if the library contained code for classes that had not yet been loaded.

Therefore, a new API was added as part of the set of system classes. The Loader class provides the developer with a mechanism to load native code for a specific Class object, thereby expediting the patching process and ensuring that the relevant Class data is already loaded into the VM. The Loader class cannot be instantiated and has a single static method:

```
public static int load(java.lang.String libraryPath,
java.lang.Class target)
throws java.io.IOException
Parameters:
libraryPath - Path of the library contained in the application's Jar file
target - Reference to the Class for which the appropriate methods should
be patched
Returns:
The number of methods for which a bytecode implementation was
replaced with a native code implementation
Throws:
java.io.IOException - if the native library cannot be fully loaded
```

This method loads the specified library and substitutes the corresponding Java methods in the specified class. The format of the library must be compatible with the underlying operating system. Upon loading, all dependencies are fully resolved before method patching begins.

For the reference implementation, this method was implemented as a native method in kvm/VmCommon/src/nativeCore.c. and compiled as part of the VM along with the other CLDC API classes, according to the following:

```
void Java_com_name_nativelib_Loader_load(void)
{
  CLASS target = popStackAsType(CLASS);
  STRING_INSTANCE libNameStr =
popStackAsType(STRING_INSTANCE);
  /* Handle to the dynamic library once loaded */
  void* handle;
  /* Attempt to load the requested library */
  if ((handle = dlopen (getStringContents(libNameStr), RTLD_NOW)) !=
NULL) {
    pushStack(patchMethods(target, dlsym, handle));
  } else {
    /* Raise an exception with relavent dlopen error info */
    raiseExceptionWithMessage(IOException, dlerror( ));
}}
```

This method uses the dlopen and dlsym calls provided by the Linux™ operating system to open a library and resolve symbols to a suitable function pointer. Use of the RTLD_NOW option ensures that all dependencies are resolved when the library is loaded; otherwise, dependency issues may not become apparent until after method patching has occurred, thereby leaving the application in an unusable state. In this implementation the library path is treated as an absolute file path in the Linux™ file system; however, a real implementation would need to interpret the path as being relative to the contents of a specific Jar file.

If the library is successfully loaded, a handle to the library along with a suitable callback function (in this case dlsym) and a reference to the class are passed to the VM's patchMethods function.

The patchMethods function is added in kvm/VmCommon/src/native.c. and is OS-agnostic but very VM-specific. The purpose of this function is to pair up methods in the class with native functions in the library and bind them together. Understandably, this function must be implemented for a specific VM since it accesses and manipulates various data structures that are closely tied to its inner workings. As the code iterates through the class's method list, it generates the corresponding KNI-style native function name for each method. The name is comprised of a Java_prefix, followed by the fully qualified class name and method name, with underscores used as the delimiting character. For example, a hypothetical native implementation for the wait method in java.lang.Object would be named "Java_java_lang_Object_wait."

For each native method name, the code uses the symbolLookupFunc callback function to get a pointer to the corresponding function in the native library (which in this case is dlsym). If a null value is returned, a native implementation does not exist and the method is left unchanged. However, if a valid function pointer is obtained, the method information is updated with the function pointer and its access flags are changed to indicate it new status as a natively implemented method, according to the following:

```
short patchMethods(CLASS theClass, void* (*symbolLookupFunc)(void*, char*),
void *handle) {
    /* String containing the symbol name for the current method */
    char *symbolName;
    /* Location in the symbol name where the method name starts */
    char *methodNameStart;
    /* Pointer to the native implementation for the current method */
    void *func;
    char *ptr;
    /* Number of methods in the class */
    short methodCount = ((INSTANCE_CLASS)theClass)>methodTable>length;
    /* Pointer to the current method */
    METHOD thisMethod =
((INSTANCE_CLASS)theClass)>methodTable>methods;
    /* Number of methods that have been patched */
    short patchCount = 0;
    /* Make sure we have at least one method */
    if (methodCount > 0) {
        START_TEMPORARY_ROOTS
        /* Allocate space to store the symbol names */
        DECLARE_TEMPORARY_ROOT(char*, symbolName, mallocBytes(80));
        /* Start the symbol name with the 'Java_' prefix */
        strcpy(symbolName, "Java_");
        /* Append the fullyqualified class name and record where the method name will
start */
        methodNameStart = getClassName_inBuffer(theClass, &symbolName[5]);
        /* Replace any slashes with underscores */
        ptr = strchr(&symbolName[5], '/');
        while (ptr != NULL) {
            *ptr = '_';
            ptr = strchr(ptr + 1, '/');
        }
        /* Append an extra underscore before the method name (no need to null
terminate the string since we'll be appending the method names anyway) */
        *(methodNameStart++) = '_';
        /* Process each of the class's methods */
        do {
            /* Update the symbol name with the current method's name */
            strcpy(methodNameStart, methodName(thisMethod));
            /* Try to obtain a function pointer with the symbol */
            if ((func = symbolLookupFunc(handle, symbolName)) != NIL) {
                /* If found, update the method entry by setting its native function
pointer and ORing its access flags with NATIVE */
                thisMethod->u.native.code = func;
                thisMethod->accessFlags |= ACC_NATIVE;
                patchCount++;
            }
            thisMethod++;
            methodCount--;
        } while (methodCount > 0);
        END_TEMPORARY_ROOTS
    }
    return patchCount;
}
```

An alternative approach would be to iterate through the native library's functions and attempt to locate a matching method in the class. However, given the organization of class data within this particular VM, this approach would require an additional lookup step: in addition to locating the method name in the constant pool, it would also be necessary to find the resulting constant index in the method table.

A simple test application was created to demonstrate the basic operation of the invention. The TestApp class performs a bubble sort on a list of 1000 random integers. Though a bubble sort is usually not the most efficient sorting algorithm, it represents a repeatable operation that is subject to some of the inherent performance constraints of Java™ (e.g. array index bounds checking), and therefore provides a good example of how this technique might be used to improve execution performance.

The bubble sort algorithm is implemented using Java™ in the class's bubbleSort method, as follows:

```
static void bubbleSort(int[ ] a) {
    int 1 = a.length;
    int swaps;
    do {
        swaps = 0;
        for (int n=a.length 1; n> 1; n) {
            if (a[n] < a[n1]) {
                int temp = a[n];
                a[n] = a[n1];
                a[n1] = temp;
                swaps++;
            }
        }
    } while (swaps > 0);
}
```

The same sort algorithm is also implemented as a native function in mylib.c, which is compiled using gcc to emit a standard Linux shared library named libmylib.so:

```
void Java_TestApp_bubbleSort(void) {
    ARRAY theArray = popStackAsType(ARRAY);
    int *firstElement = ((SHORTARRAY)theArray)>sdata;
    int length = theArray>length;
    int n;
    int *ptr;
    int temp;
    int swaps = 0;
    int totalSwaps = 0;
    do {
        ptr = firstElement + length 1;
        swaps = 0;
        for (n=length 2; n > 0; n) {
            if (*ptr < *(ptr)) {
                temp = *ptr;
                *ptr = *(ptr + 1);
                *(ptr + 1) = temp;
                swaps++;
            }
        }
    } while (swaps > 0);
}
```

The native function is coded slightly differently from the Java version and makes extensive use of pointers to improve performance. Seemingly subtle techniques such as these can offer significant performance improvements and demonstrate the value of native code access. The TestApp class also defines a runBenchmark method to create a clone of a predefined list of random numbers and sort it by calling the bubbleSort method:

```
public static long runBenchmark( ) {
    /* Create a copy of the unsorted list. We cannot run the benchmark
    * on the original list since it could not be unsorted afterward
    */
    int[ ] workingList = new int[LIST_SIZE];
    System.arraycopy(unsortedList, 0, workingList, 0, LIST_SIZE);
    long t = System.currentTimeMillis( );
    bubbleSort(workingList);
    return System.currentTimeMillis( ) t;
}
```

The main method first runs the benchmark, and then attempts to load the native library and run the benchmark again (note that the same bubbleSort method is being called both times, but in reality different code is being invoked), according to the following:

```
public static void main(String[ ] args) {
    // Run the benchmark with the Java implementation of bubbleSort
    System.out.println("Time to sort (Java implementation) = " + runBenchmark( ));
    // Try to replace the Java implementation of bubbleSort with a native
    // implementation
    try {
        // Load the libmylib.so library and use its functions to patch this class
        int s = Loader.load("/mnt/hgfs/natlib/libmylib. so", Class.forName("TestApp"));
        System.out.println("Patched " + s + " native methods");
        // Rerun the benchmark with the native implementation of bubbleSort
        System.out.println("Time to sort (native implementation) = " + runBenchmark( ));
    }catch (Throwable e) {
        e.printStackTrace( );
    }
}
```

When executed, the test application produces the following results:

Time to sort (Java implementation)=495
Patched 1 native methods
Time to sort (native implementation)=15

As seen from the sample output, the use of native code can yield dramatic performance gains.

It should be noted that the CLDC RI is a non-optimized, interpreted VM, so such impressive results are to be expected. Nevertheless, native code still yields significant performance gains on highly optimized VM's that utilize Just-In-Time (JIT) compilers.

The above described embodiments, while including the preferred embodiment and the best mode of the invention

What is claimed is:

1. A method of executing a program on an interpreted bytecode language virtual machine, operable on a digital computer that stores a method table that includes a plurality of method entries, comprising the actions of:
   loading a plurality of interpreted bytecode modules, in which each interpreted bytecode module is written in the interpreted bytecode and has a name associated therewith;
   directing a pointer from each method entry in the method table to a different interpreted bytecode module of the plurality of interpreted bytecode modules so that each method entry points to a corresponding interpreted bytecode module;
   loading a first native code module library that includes at least one first native code module that implements a function corresponding to a selected interpreted bytecode module of the plurality of interpreted bytecode modules, the first native code module also having a name associated therewith that corresponds to the selected interpreted bytecode module;
   redirecting the pointer from the method entry corresponding to the interpreted bytecode module to select a native code corresponding to the method entry corresponding to the interpreted bytecode module so that the pointer points to the selected native code module corresponding to the interpreted bytecode module when the name of an interpreted bytecode module corresponds to the name of a native code module;
   executing the selected native code module in the method table; and
   executing an interpreted bytecode module that corresponds to the selected native code module pointed to by the method entry in the method table when the selected native code module is not executable.

2. The method of claim 1, further comprising the actions of:
   loading a second native code module library that includes at least one second native code module that implements a function corresponding to the selected interpreted bytecode module of the plurality of interpreted bytecode modules, the second native code module also having a name associated therewith that corresponds to the selected interpreted bytecode module; and
   selectively redirecting the pointer from the method entry corresponding to the interpreted bytecode module so that the pointer points to the first native code module or the second native code module, depending of a predetermined preference.

3. The method of claim 1, further comprising the action of executing each interpreted bytecode module and native code module pointed to by the each method entry in the method table according to a application-controlled order of execution.

4. The method of claim 1, further comprising the action of deleting any of the interpreted bytecode modules that are not pointed to by a method entry in the method table.

5. The method of claim 1, further comprising the action of writing each native code module in a native computer language.

6. The method of claim 5, wherein the native computer language comprises a computer language that is compiled into a machine-specific code.

7. The method of claim 6, further comprising the actions of:
   compiling at least one native code module into the machine-specific code, thereby generating a corresponding native code module; and
   storing the native code module in a native methods table.

8. The method of claim 1, further comprising the actions of interpreting the interpreted bytecode modules using a selected application programming interface.

9. The method of claim 8, wherein each interpreted bytecode module comprises a method written in Java™.

10. A method of executing interpreted bytecode, operable on a digital computer that stores a method table that includes a plurality of method entries, each method entry corresponding to a predetermined code module, the method comprising the actions of:
    determining whether each method entry corresponds to an interpreted bytecode module or a native language module; and
    executing the native language module if a method entry corresponds to a native language module and further executing an interpreted bytecode module when the native language module is not executable.

11. The method of claim 10, further comprising the actions of:
    loading an interpreted bytecode module section that includes a plurality of interpreted bytecode modules;
    generating a method table that comprises a plurality of method entries, wherein each method entry includes a pointer that pointes to a selected interpreted bytecode module;
    loading a native code module library that includes a plurality of native code modules; and
    redirecting the pointer of each method entry to a corresponding native code module when the pointer points to an interpreted bytecode module in which a native code module corresponds the interpreted bytecode module.

12. The method of claim 11, wherein the executing action comprises the action of executing each module pointed to the method entries according to an application-controlled order of execution.

13. The method of claim 11, further comprising the action of deleting each interpreted bytecode module in which a native code module corresponds to the interpreted bytecode module.

14. The method of claim 13, wherein each interpreted bytecode module comprises a method written in Java™.

15. A system for executing interpreted bytecode, comprising:
    a computer-readable memory that stores a plurality of interpreted bytecode modules, a method table and a native code module library, the method table including a plurality of method entries, wherein each method entry points to a selected one of either an interpreted bytecode module stored in the plurality of interpreted bytecode modules or to a native code module in the native code module library; and
    a processor that is configured to execute an interpreted bytecode module corresponding to the selected native code module pointed to by a method entry when the selected native code module is not executable.

16. The system of claim 15, wherein the processor is also configured to execute each interpreted bytecode module and native code module pointed to by the plurality of method entries in the method table according to a predefined order of execution.

17. The system of claim 15, wherein the processor is also configured to delete from the computer-readable memory any interpreted bytecode module that is not pointed to by a method entry.

18. The system of claim 15, wherein the processor is also configured to execute an interpreted bytecode virtual machine that interprets the interpreted bytecode for execution by the processor.

19. The system of claim 15, wherein each native code module comprises code written in a native computer language.

20. The method of claim 19, wherein each interpreted bytecode module comprises a method written in Java™.

* * * * *